United States Patent
Goh et al.

(10) Patent No.: US 8,330,829 B2
(45) Date of Patent: Dec. 11, 2012

(54) PHOTOGRAPHIC FLICKER DETECTION AND COMPENSATION

(75) Inventors: Roy Goh, Redmond, WA (US); Andrew Juenger, Woodinville, WA (US); Yi He, Issaquah, WA (US); Stuart William Milton, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 12/755,952

(22) Filed: Apr. 7, 2010

(65) Prior Publication Data

US 2011/0157415 A1   Jun. 30, 2011

Related U.S. Application Data

(60) Provisional application No. 61/291,607, filed on Dec. 31, 2009.

(51) Int. Cl.
H04N 9/73    (2006.01)
(52) U.S. Cl. ................... 348/226.1; 348/227.1
(58) Field of Classification Search ..... 348/226.1–228.1
See application file for complete search history.

(56) References Cited

U.S. PATENT DOCUMENTS

| | | | |
|---|---|---|---|
| 5,272,539 A | 12/1993 | Kondo | |
| 6,999,118 B2 | 2/2006 | Suzuki | |
| 7,034,870 B2 | 4/2006 | Nagaoka et al. | |
| 7,187,405 B2 | 3/2007 | Poplin et al. | |
| 7,248,289 B2 | 7/2007 | Katoh et al. | |
| 7,289,144 B2 | 10/2007 | Arazaki | |
| 7,502,054 B2 * | 3/2009 | Kalapathy et al. | 348/226.1 |
| 7,538,799 B2 | 5/2009 | Yanof | |
| 2004/0080630 A1 * | 4/2004 | Kim | 348/226.1 |
| 2005/0225649 A1 * | 10/2005 | Shinotsuka | 348/226.1 |
| 2007/0085912 A1 | 4/2007 | Hakola et al. | |
| 2008/0309791 A1 | 12/2008 | Nishiwaki et al. | |
| 2009/0128660 A1 * | 5/2009 | Dai et al. | 348/228.1 |
| 2009/0147103 A1 * | 6/2009 | Chao | 348/226.1 |

OTHER PUBLICATIONS

Poplin, Dwight, "An Automatic Flicker Detection Method for Embedded Camera Systems", Retrieved at <<http://ieeexplore.ieee.org/stamp/stamp.jsp?arnumber=01649642>> IEEE Transactions on Consumer Electronics, May 2006, vol. 52, No. 2,pp. 308-311.
"International Search Report", Mailed Date: Aug. 3, 2011, Application No. PCT/US2010/059595, Filed Date: Dec. 9, 2010, pp. 6.

\* cited by examiner

*Primary Examiner* — Sinh Tran
*Assistant Examiner* — Christopher K Peterson
(74) *Attorney, Agent, or Firm* — Alleman Hall McCoy Russell & Tuttle LLP

(57) ABSTRACT

One disclosed embodiment includes detecting flicker in a photographic setting. A plurality of samples are obtained from a light detector circuit of a camera, each of which has a value that is dependent upon intensity of light incident upon the camera. The method further includes processing the samples to identify whether the incident light is varying in intensity at one or more pre-selected frequencies. The processing may include multiplying the samples with one or more periodic signals to generate scalar product outputs, and analyzing the scalar product outputs to ascertain the presence of periodic flicker.

18 Claims, 3 Drawing Sheets

PHOTOGRAPHIC FLICKER DETECTION AND COMPENSATION

CROSS REFERENCE TO RELATED APPLICATIONS

This application claims priority to U.S. App. Ser. No. 61/291,607, filed Dec. 31, 2009, the entirety of which is hereby incorporated herein by reference.

BACKGROUND

Fluorescent lamps typically employ ballast mechanisms that can cause light output to vary in intensity at a rate twice the frequency of the alternating current (AC) power supplied to the fluorescent lamp. The varying intensity, or flicker, of the lamps is generally not detectable by the human eye, but it can interact with a camera's image sensors. In some cases, flicker may cause noticeable artifacts to appear in video images, such as non-static banding or fluctuating brightness. A camera may substantially reduce these artifacts by using a set of exposure timings that are matched to the AC frequency supplied to the fluorescent lamps. However, there are two main AC frequencies used throughout the world, 50 Hz and 60 Hz. This presents the issue of identifying the frequency that is employed, and then setting exposure timings on the camera to make the appropriate compensation. This may be performed manually by the user, but such an approach involves an extra manual step and the possibility of operator error. An alternate approach is to pre-configure the camera during manufacture to employ compensation for a specific AC frequency (e.g., 60 Hz). With this approach, however, a manufacturer would have to make different cameras for use in different parts of the world. Also, a camera designed for a particular frequency wouldn't perform as well if taken to region employing a different AC frequency.

SUMMARY

Accordingly, various embodiments are disclosed herein that relate to detecting and compensating for the presence of periodic flicker in photographic settings. For example, one disclosed embodiment includes obtaining a plurality of samples from a light detector circuit of a camera, each of which is an electrical signal having a value that is dependent in some fashion upon intensity of light to which the camera is exposed. The method further includes processing the samples to identify whether the incident light is varying in intensity at one or more pre-selected frequencies. Such processing may include multiplying the samples with one or more periodic signals to generate scalar product outputs, and analyzing the scalar product outputs to ascertain the presence of periodic flicker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As indicated above, it will often be desirable to configure video recording devices and other cameras to account for periodic changes in the ambient light environment. Fluorescent lights are a common source of periodic variation in light intensity, or flicker. Fluorescent light sources produce light as a result of being driven by electrical components known as ballasts. In particular, the ballast causes excitation of gas within the light fixture in order to produce light. The AC power that drives the ballast causes the excitation to vary slightly. Specifically, there are two peaks of excitation for each period of the AC waveform, resulting in flicker occurring at twice the AC power frequency. The flicker typically is undetectable by the human eye, though it can interact with the image sensors of a camera to produce undesirable artifacts. To reduce such artifacts, the exposure timings of a camera may be synchronized with the periodic intensity variations of the ambient light. Since there are two main AC frequencies used throughout the world, 50 Hz and 60 Hz, causing intensity variations at 100 Hz and 120 Hz, respectively, it will often be desirable to configure the camera with the exposure timings correlated to the local AC power frequency.

One solution for configuring the camera is to have a user of the camera manually configure the camera with the local AC power frequency. For example, the user may select the local AC power frequency from a menu presented on a display of the camera. A second solution is to make one model of the camera for 50 Hz AC power and a second for 60 Hz AC power. The different models could then be identified by different stock-keeping units (SKU).

In an alternate solution, the camera may include a detector for automatically detecting intensity variations in the ambient light. One potential advantage of this solution is that a user cannot inadvertently configure the camera with the wrong AC power frequency. Another potential advantage is eliminating the need to make different camera models. Yet another benefit is that the device can automatically adjust and operate correctly when placed into a different flicker environment, such as when a user of the camera travels to a region with a different AC power frequency. Accordingly, various systems and methods are disclosed for automatically detecting and adjusting or compensating for periodic flicker.

Figure 1:
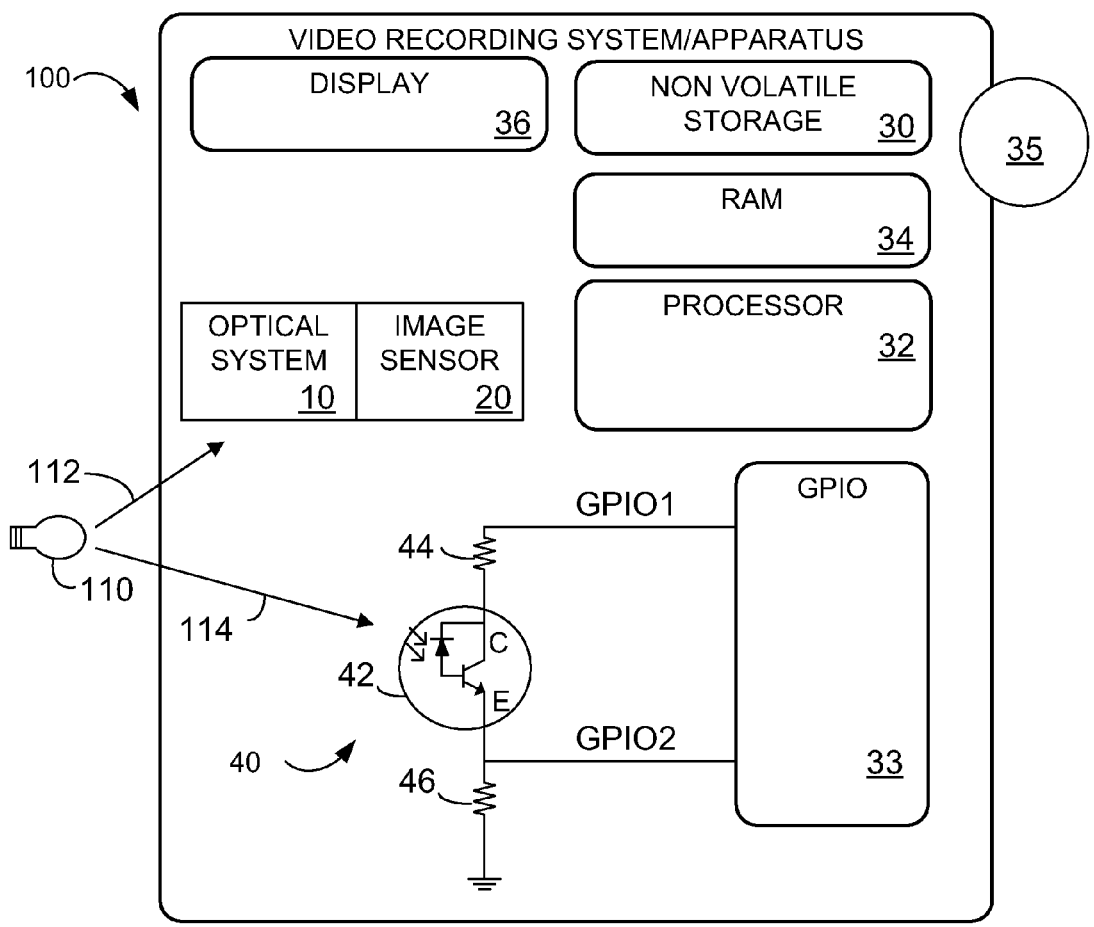
FIG. 1 shows an embodiment of a camera including a light detector circuit.

FIG. 1 shows an example embodiment of a camera 100 including optical system 10, image sensor 20, light detector circuit 40, and a logic subsystem such as processor 32. Camera 100 may operate in an ambient light environment that includes a flickering light source, such as fluorescent lamp 110. When the camera is introduced into such a photographic setting, light from fluorescent lamp 110 may be incident upon image sensor 20 and light detector circuit 40, as indicated by rays 112 and 114, respectively.

Optical system 10 may comprise a lens system for focusing an image onto image sensor 20. Optical system 10 may include filters, such as an infrared blocking filter, or color filters for directing red, green, and blue light toward selected pixels of image sensor 20, for example. Image sensor 20 converts the image from optical system 10 into a set of electrical signals that are sent to processor 32. Image sensor 20 may be a charge-coupled device (CCD), a complementary metal-oxide-semiconductor (CMOS) active pixel sensor, or any other suitable device. Image sensor 20 typically comprises an array of pixels arranged in a series of rows and columns.

Image sensor 20 may include an electronic shutter controlled by processor 32, or another mechanism to control the integration time of each row of pixels. "Integration time" refers to the amount of time that an image sensor (or portion thereof) is exposed to light, and is thus analogous to the photographic term "exposure." When the integration time of the pixels is not synchronized with flicker present in the ambient light, artifacts such as non-static banding or fluctuating brightness may appear in video images. Brightness variation artifacts may appear within a given frame or static image, or may occur frame-to-frame in a video stream. One source of flicker may be a fluorescent lamp flickering at a rate twice the frequency of the alternating current (AC) power supplied to the ballast that drives the fluorescent lamp. Another source of flicker may be light from a computer monitor flickering at the monitor's refresh rate. If it can be determined that the recording environment includes light intensity that varies at a particular frequency (e.g., periodic flicker resulting from a fluorescent light source), the integration time of the pixels may be adjusted to reduce or eliminate potential artifacts.

In addition to processor 32, camera 100 may be provided with various other components to perform flicker detection/compensation and to carry out other tasks. As an example, camera 100 may include general purpose input and output logic (GPIO) 33 (e.g., a chip or chipset) and a data-holding subsystem, which may include non-volatile storage 30, random access memory (RAM) 34, and/or removable media 35. In one embodiment of camera 100, the electronic components may be integrated into one or more common devices, such as an application specific integrated circuit (ASIC) or a system on a chip (SOC). Camera 100 may optionally include display 36 and/or other components not shown in FIG. 1.

Processor 32 may be configured to execute one or more instructions stored in the data-holding subsystem. For example, processor 32 may be configured to process electrical signals produced in response to light exposure and, in response, adjust or otherwise control the exposure timings of image sensor 20. Non-limiting examples of nonvolatile storage 30 include flash memory and a hard disc drive. RAM 34 may also be configured to hold instructions for execution by processor 32. Processor 32 may be configured to cause image data from image sensor 20 to be stored in RAM 24, nonvolatile storage 30, and/or removable media 35. Non-limiting examples of removable media 35 include videotape, recordable optical discs, and memory cards. In an alternate embodiment, processor 32 may be configured to cause image data from image sensor 20 to be transmitted to a computing device via a video cable and/or a wired or wireless network.

When included, display subsystem 36 may be used to present a visual representation of data held by the data-holding subsystem. For example, display subsystem 36 may be used to display image data from image sensor 20, such as on a display screen and/or through an optical viewfinder. In another example, display subsystem 36 may be used to display image data stored in removable media 35. In this manner, a viewer may view images that are stored in the camera. Display subsystem 36 may include optical components, as indicated above, or one or more display devices utilizing virtually any type of display technology, such as a liquid crystal display (LCD).

The logic subsystem of camera 100 may be configured to communicate via one or more signal pins of GPIO 33. In particular, as explained in detail below, GPIO 33 provides an example of a mechanism that may be used to sample electrical signals from a light detector circuit, such as light detector circuit 40. GPIO 33 includes logic connected to a first GPIO signal pin, GPIO1, and to a second GPIO signal pin, GPIO2. A GPIO signal pin may be programmed to be an input or an output. When programmed as an output, GPIO 33 may drive a logic zero or a logic one onto a signal pin. For example, the voltage at ground may be a logic zero, and the power supply voltage, $V_{DD}$, of the logic subsystem may be a logic one. When programmed as an input, GPIO 33 may read a logic zero or a logic one from a signal pin. The voltage on a GPIO signal pin may be between ground and $V_{DD}$. When the GPIO signal pin is configured as an input, the voltage on the GPIO signal pin may be interpreted as a logic one when the voltage exceeds the $V_{IH}$ voltage and as a logic zero otherwise. The $V_{DD}$ and $V_{IH}$ parameters are a function of the devices used to implement the logic subsystem. The PIC18F2550 manufactured by Microchip Technology™, Inc., Chandler, Ariz., is an example of an inexpensive controller that includes GPIO logic and signal pins.

Generally, light detector circuit 40 is responsive to the intensity of light that is incident on the camera (e.g., the video recording device). For example, the circuit may be configured to respond to ambient light intensity by yielding an electrical signal proportional to the intensity of the incident light. In this manner, the intensity of ambient light may be measured. In one example, an output of light detector circuit 40 may be sampled at different points in time. As explained below, the sampling may be conducted via control signals applied to light detector circuit 40 from GPIO 33. The obtained samples may then be processed (e.g., via instructions executed by processor 32) to identify periodic intensity variations in the incident light.

In some cases, it may be desirable to employ processing which seeks to identify variations in intensity that occur at one of a plurality of pre-selected discrete frequencies. For example, given that the large majority of the world employs AC power causing fluorescent lamp flicker to occur at either 100 Hz or 120 Hz, one approach would be to conduct the processing to look for just these frequencies. Such an approach may be advantageous from an efficiency standpoint, and may enable the use of low-cost components and computational methods that consume minimal resources. As discussed in more detail below, looking for specific discrete frequencies (whether two or otherwise) is a non-limiting example, and variety of other implementations may be used.

Light detector circuit 40 typically includes a light sensor with an output that varies according to the intensity of the light incident upon light sensor. Non-limiting examples of light sensors include phototransistors, photodiodes, photoresistors, and charge-coupled devices. The light sensor may be a low-cost discrete component, producing output soon after camera 100 is powered on. For example, the light sensor may produce an output before other components of camera 100 are initialized. In this manner, the light sensor output may be used to determine exposure timings of image sensor 20 quickly upon start-up, prior to a user operating camera 100. In an alternate embodiment, the light sensor may be integrated with other electronic components of camera 100 into one or more common devices, such as an ASIC or a SOC.

In the example embodiment of FIG. 1, light detector circuit 40 is connected to GPIO 33 via GPIO signal pins, GPIO1 and GPIO2. Phototransistor 42 converts light into an electrical signal proportional to the intensity of the light incident upon phototransistor 42. Light may be directed toward phototransistor 42 by optical system 10. For example, optical system 10 may include lenses, filters, mirrors and/or other optical components to direct light to image sensor 20. In some embodiments, phototransistor 42 is placed in the optical pathway formed by these components. Alternatively, light may reach phototransistor 42 through direct exposure, or otherwise independently of optical system 10, for example, by situating the phototransistor at or near an external housing of the camera. Phototransistors may be manufactured with varying sensitivities to different wavelengths of light. Phototransistor 42 may be manufactured to be sensitive to the visible spectrum of light, from approximately 380 nanometers (nm) to 750 nm. Phototransistors are a specialized form of bipolar junction transistor including a base, a collector, an emitter and a parasitic capacitor between the collector and emitter. The OSRAM™ SFH 310 photoransistor (OSRAM Opto Semiconductors™, Regensburg, Germany) may be suitable for phototransistor 42, for example.

Resistors 44 and 46 bias phototransistor 42 so that current generated by light striking the base-collector region of phototransistor 42 may be amplified as current flowing from collector C to emitter E. Resistor 44 is connected between the GPIO1 signal pin and the collector of phototransistor 42. Resistor 46 is connected to ground on one side and to the GPIO2 signal pin and the emitter of phototransistor 42 on the other side. The resistance of resistor 46 may be much larger than the resistance of resistor 44. For example, the values of resistors 44 and 46 may be 10 ohms and 510 kilohms, respectively.

Figure 2:
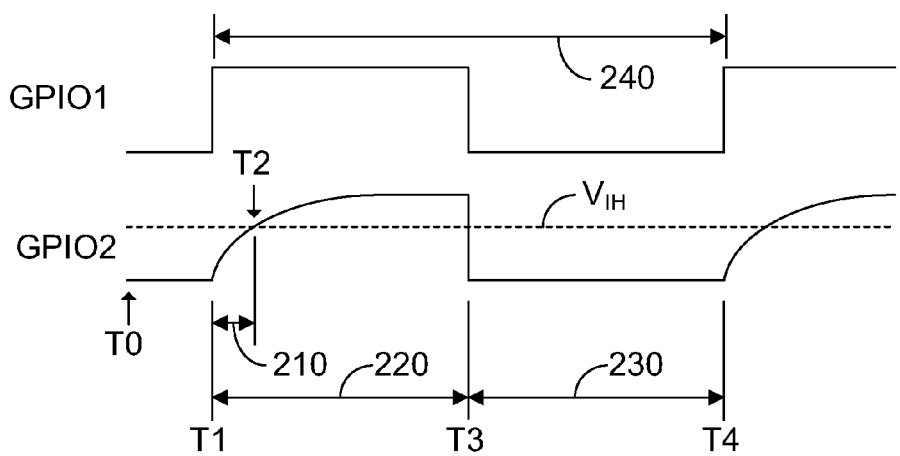
FIG. 2 shows a timing diagram of signals from the nodes of the light detector circuit.

FIG. 2 is a timing diagram that illustrates one example of how light detector circuit 40 may be used to detect the intensity of light incident upon phototransistor 42. In the example of FIG. 2, light detector circuit 40 is alternately discharged and charged so that a rise time of light detector circuit 40 may be measured successively to generate a plurality of rise time samples. The rise time of light detector circuit 40 is proportional to the intensity of the light incident upon light detector circuit 40. In alternative embodiments, other properties of light detector circuit 40 may be measured, such as a current through phototransistor 42 or a voltage across resistor 46. As indicated above, numerous possibilities exist for generating and sampling electrical signals that vary in response to ambient light intensity.

Continuing with the example of FIG. 2, at time T0, light detector circuit 40 is in the discharge state. GPIO signal pins GPIO1 and GPIO2 are configured as outputs driven to a logic zero. At time T1, light detector circuit 40 is switched to the charge state by the low-to-high transition of GPIO1. GPIO1 is configured as an output driving a logic one and GPIO2 is configured as an input. In steady-state, when enough light is incident upon phototransistor 42, the voltage of GPIO2 will be given by the voltage divider formed by resistors 44 and 46. When resistor 46 has a much larger resistance value than resistor 44, the voltage of GPIO2 will exceed $V_{IH}$ and the GPIO2 input will be interpreted as a logic one.

However, in the transient state beginning at time T1, the parasitic capacitor of phototransistor 42 prevents the voltage from changing instantaneously across the collector and emitter of phototransistor 42. The parasitic capacitor charges at a rate determined by its capacitance, the resistance of resistors 44 and 46, $V_{DD}$, and the amount of light incident on phototransistor 42. As the capacitor charges, the voltage of GPIO2 may increase until the circuit reaches steady-state or until the voltage of GPIO1 is driven with a logic zero. In FIG. 2, the voltage of GPIO2 reaches steady-state and the voltage of GPIO2 exceeds $V_{IH}$ at time T2. Rise time 210, which is the difference between time T2 and T1, may be measured as a representation of the amount (intensity) of light striking phototransistor 42. When the light striking phototransistor 42 is increased (i.e., higher intensity), the parasitic capacitor will charge faster and rise time 210 will be decreased. Thus, there is an inverse relationship between the intensity of ambient light and rise time 210. Charge time 220, which is the difference between time T3 and T1, may be set so that rise time 210 is less than charge time 220 for expected ranges of ambient light intensity and tolerances of the resistance of resistors 44 and 46, $V_{DD}$, and capacitance of phototransistor 42.

At time T3, light detector circuit 40 is returned to the discharge state. GPIO1 and GPIO2 are configured as outputs driving logic zeroes. This may enable parasitic capacitor of phototransistor 42 to quickly discharge through small resistor 44. By discharging the parasitic capacitor, light detector circuit 40 is enabled for the next charge state at time T4. Discharge time 230, which is the difference between time T4 and T3, may be shorter than charge time 220. Sample period 240 is the sum of charge time 220 and discharge time 230.

From the above, it will be appreciated that the timing diagram of FIG. 2 provides an example of how an individual sample may be obtained from the light detector circuit. It will be appreciated, however, that multiple samples typically are obtained. Specifically, a series of samples may be collected from light detector circuit 40 via multiple cycles of the charge and discharge operation described above. The samples may be retained by recording each rise time 210 as it occurs, for example by writing the rise time into a storage location (e.g., in RAM 34 or non-volatile storage 30).

Figure 3:
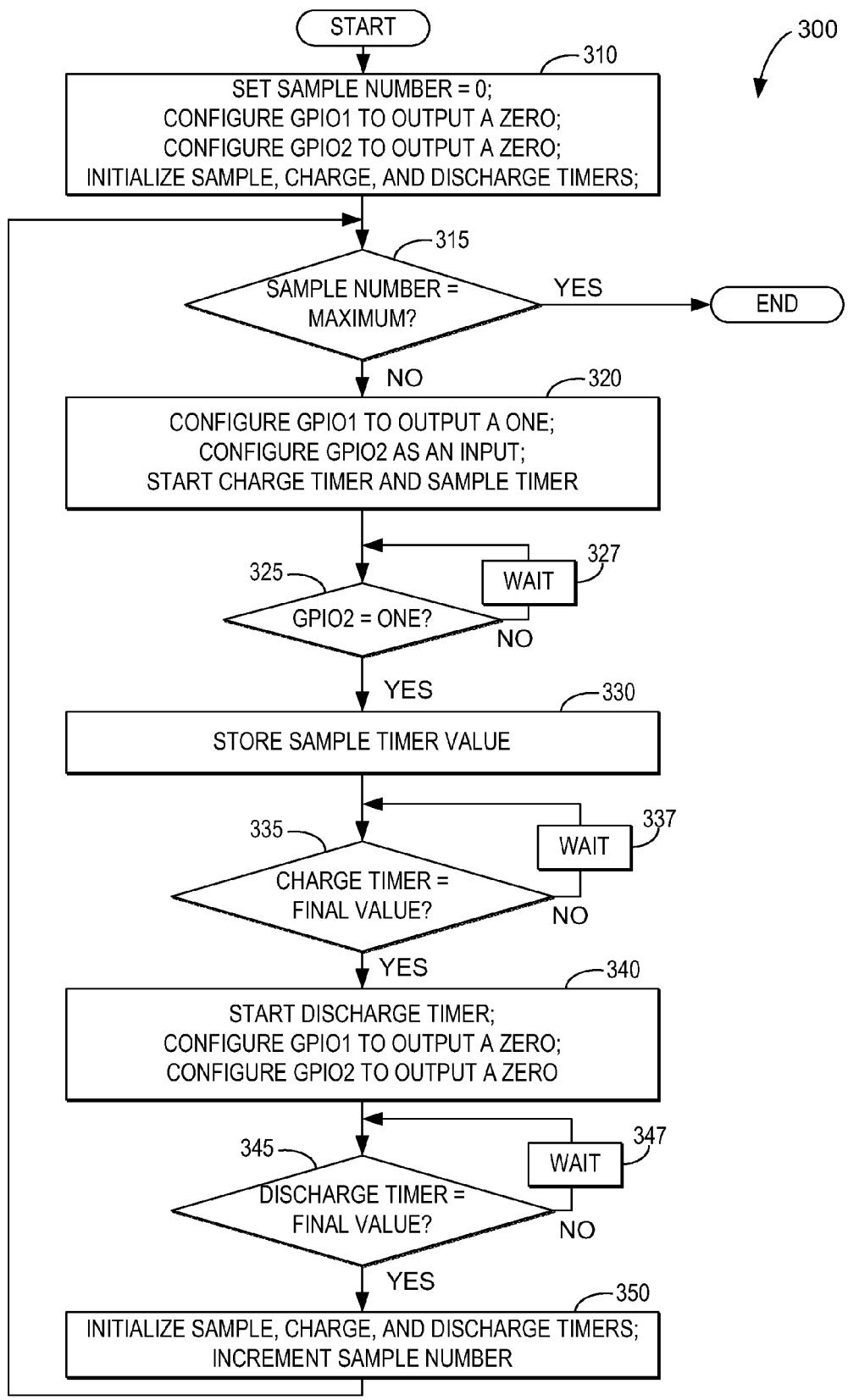
FIG. 3 shows an embodiment of a method for sampling electrical signals that vary in response to ambient light intensity.

Turning now to FIG. 3, an example method will be described for obtaining a plurality of samples. The method is applicable to obtaining any desired number of samples. As will be explained in more detail below, the desired number of samples and other sampling parameters may be dependent upon various factors. Generally, it will be desirable to minimize the amount of sampling, while at the same time providing a number of samples that provides high-confidence output and that is well-suited to the computational methods that are employed to discern flicker intensity. In addition, employing an appropriate number of samples will in some cases facilitate use of efficient methods and processes that reduce the complexity and time associated with processing the samples.

FIG. 3 shows an example embodiment of a method for obtaining a plurality of rise time samples from light detector circuit 40. In describing FIG. 3, various references will also be made to components and signal elements shown in FIGS. 1 and 2. At 310, the sample number is set to zero and the GPIO signal pins, GPIO1 and GPIO2, are configured as outputs driving a logic zero. In this way, the parasitic capacitor of phototransistor 42 may be discharged as illustrated at T0 of FIG. 2. The sample timer, charge timer and discharge timer are initialized to their starting value. The sample timer, charge timer and discharge timer may be implemented via executable instructions carried out by processor 32 (FIG. 1). In an example embodiment, the timers may be initialized to zero so the timers may be incremented to show the passage of time. In an alternative embodiment, the timers may be written with a desired value associated with a timing interval and the timers may be decremented to show the passage of time.

Next, at 315, the sample number is compared to a maximum number of samples. If the sample number equals the maximum number of samples, all samples have been obtained and processing ends. If the sample number is less than the maximum number of samples, more samples need to be obtained and method 300 continues at 320.

At 320, GPIO1 is configured to drive a logical output of one and GPIO2 is configured as an input. The charge timer and the sample timer may be started. The timers may be implemented with dedicated hardware timers or software loops, for example. In this manner, light detector circuit 40 may begin a charge state, such as at time T1 in FIG. 2. At 325, it is determined if the voltage on GPIO2 exceeds $V_{IH}$ and is a logic one. If GPIO2 is a logic one, method 300 continues at 330. Otherwise, routine 300 continues at 327. At 327, method 300 waits before continuing to 325. Steps 325 and 327 may be performed by actively polling on the GPIO2 value or by waiting for an interrupt associated with the GPIO2 value, for example.

At 330, the voltage on the GPIO2 signal pin is greater than or equal to $V_{IH}$ and the sample timer value can be stored. This corresponds to time T2 in FIG. 2. The value of the sample timer measures the rise time of the GPIO2 signal from a logic zero to a logic one. The sample timer value may be used as a single sample of the ambient light intensity signal. At 335, it is determined if the charge timer is equal to the final value of the charge timer. The final value of the charge timer may be zero when the timer is decremented to show the passage of time. In an alternative embodiment, the final value of the charge timer may be another value when the timer is incremented to show the passage of time. The charge timer values are selected so that the charge timer reaches its final value when charge time 220 has elapsed, corresponding to time T3 in FIG. 2. If the charge timer is equal to the final charge timer value, method 300 continues at 340. If the charge timer is not equal to the final charge timer value, method 300 continues at 337. At 337, method 300 waits before continuing to 335. Steps 335 and 337 may be performed by actively polling on a value generated by software or a hardware timer, or by waiting for an interrupt associated with a hardware timer, for example.

At 340, GPIO1 and GPIO 2 are configured as outputs driving logic zeroes. The discharge timer may be started. In this manner, light detector circuit 40 may begin a discharge state, such as at time T3 in FIG. 2. During the discharge state, the parasitic capacitor of phototransistor 42 may be discharged. At 345, it is determined if the discharge timer is equal to the final value of the discharge timer. The discharge timer values are selected so that the discharge timer reaches its final value when discharge time 230 has elapsed, corresponding to time T4 in FIG. 2. If the discharge timer is equal to the final value of the discharge timer, method 300 continues at 350. Otherwise, method 300 continues at 347 where method 300 waits before continuing at 345.

At 350, method 300 prepares the timers for another iteration of the sample loop. The sample timer, charge timer, and discharge timers are initialized to their initial values. The sample number is incremented and method 300 continues at 315. In this manner, a plurality of rise time samples from light detector 40 may be obtained.

Figure 4:
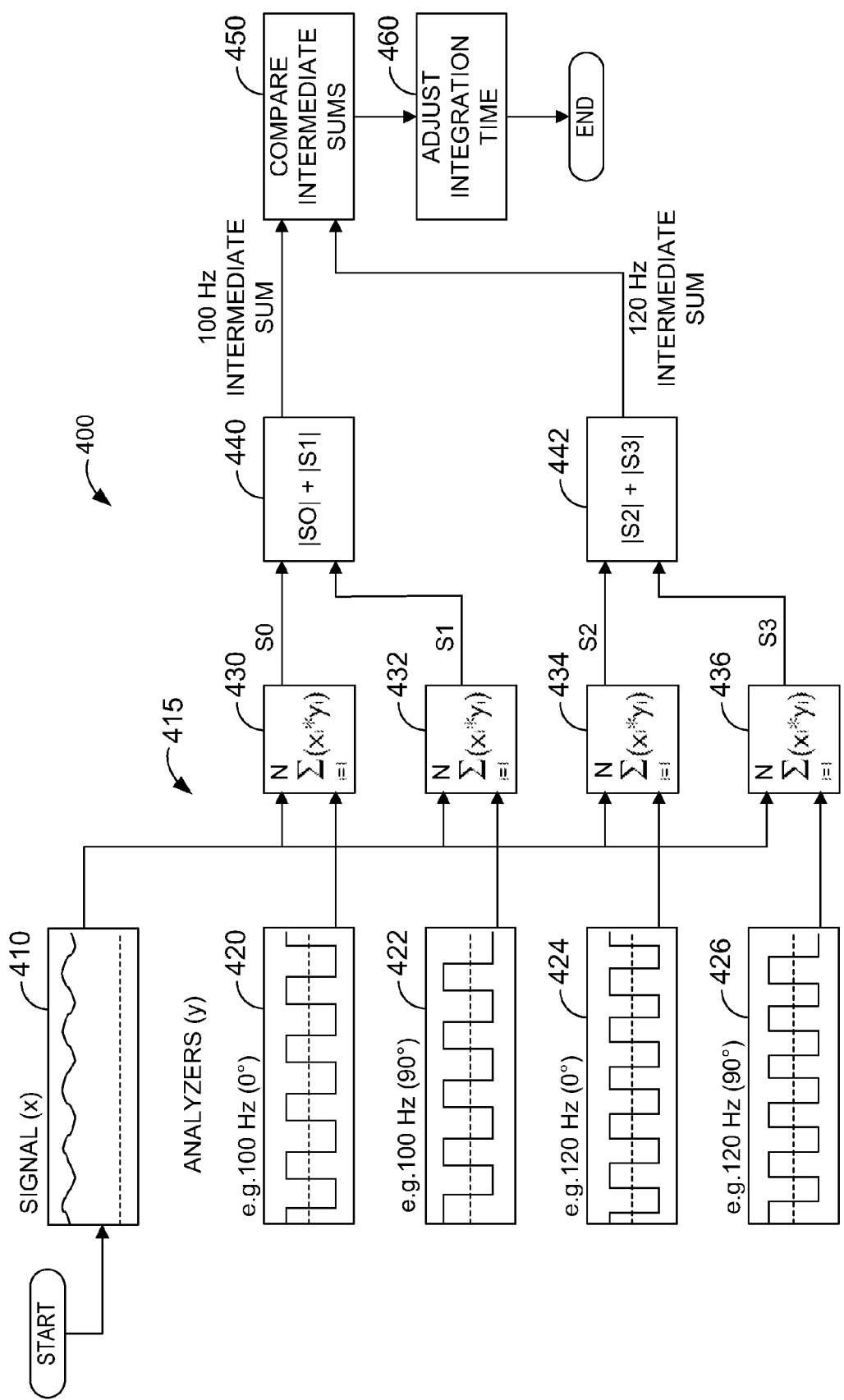
FIG. 4 shows an embodiment of a method for processing samples to identify whether ambient light associated with the samples varies in intensity at one of a plurality of pre-selected frequencies.

The plurality of rise time samples may be processed as illustrated in the example embodiment of FIG. 4 to identify periodic intensity variations. More particularly, the example illustrates processing that is used to determine whether the light that was incident on the detector was varying in intensity at one of a plurality of pre-selected frequencies. For example, the flicker of light from a fluorescent lamp may be analyzed to determine if the fluorescent lamp is powered by a 50 Hz AC power supply or a 60 Hz AC power supply, with resulting intensity variation occurring at 100 Hz or 120 Hz, respectively.

At 410, samples are obtained, for example using the systems and methods described with respect to FIGS. 1-3. In one embodiment, N samples of the signal are obtained over the entire timing window before sample processing begins. In an alternative embodiment, sampling may occur in parallel with sample processing. At least one sample is obtained before processing may begin and N samples are obtained before processing may end. Once processing is to begin, samples of the signal are passed to blocks 430, 432, 434, and 436 to generate scalar products, as explained below.

At 420, 422, 424, and 426, square waves are generated for calculating a set of scalar products. In the present example, two square waves are employed for each discrete frequency of intensity variation to be detected. Each square wave alternates between one and zero at the frequency to be detected. In some embodiments, the duty cycle of the waves may be 50%, such that the square wave is high (e.g., one) for half of the period and low (e.g., zero) for half of the period. In an alternate embodiment, the square wave may alternate between positive and negative values (e.g., positive one and negative one). Typically, the two square waves used for a given frequency are deployed 90 degrees out of phase relative to one another. In some embodiments, such use of phase-shifted waveforms can enable frequency detection at an arbitrary phase, since the source flicker and the sampling in the camera are generally asynchronous.

The present example is presented in the context of identifying whether nearby fluorescent light sources are powered by 50 Hz or 60 Hz AC power. Accordingly, four square waves are employed—two at 100 Hz and two others at 120 Hz. In particular, at 420, a first square wave is generated with a frequency of 100 Hz. At 422, a second square wave is generated having the same frequency as the first but 90 degrees out of phase. At 424, a third square wave is generated with a frequency of 120 Hz. At 426, a fourth square wave is generated with same frequency as the third but 90 degrees out of phase. As shown at blocks 430, 432, 434, and 436, the square waves are mixed with samples 410 to generate scalar products.

Specifically, at 430, 432, 434 and 436, scalar products are calculated by mixing (multiplying) the samples individually with each of the four square waves. The resulting value of the summations (i.e., the S0, S1, S2 and S3 scalar products) will depend on the particular implementation of the square waves, such as whether the low portion of the square wave is negative, zero or some other value.

At 440 and 442, intermediate sums are generated for the scalar products at each frequency. In particular, at 440, a 100 Hz scalar product output is calculated by adding the absolute value of scalar product S0 to the absolute value of scalar product S1. At 442, a 120 Hz scalar product output is calculated by adding the absolute value of scalar product S2 to the absolute value of scalar product S3. The relative magnitudes of the 100 Hz intermediate sum and the 120 Hz intermediate sum may indicate whether the underlying light source is varying in intensity (flickering) at 100 Hz or 120 Hz, or neither. This analysis may be performed, for example, at block 450.

In particular, at 450, the intermediate sums are compared to determine whether the underlying light source is varying in intensity at one of the pre-selected frequencies, i.e., 100 Hz or 120 Hz in the current example. For example, a relatively larger intermediate sum may indicate that flicker is occurring at the frequency associated with that intermediate sum. More particularly, depending on the number of samples and experimental observation, it might be established that whenever the 100 Hz intermediate sum is larger than the 120 Hz intermediate sum by a factor of four, then the setting is a 50 Hz AC environment. Conversely, a 60 Hz AC environment would be inferred when the 120 Hz intermediate sum was at least four times larger than the 100 Hz intermediate sum. If neither condition existed, then it could be inferred, for example, that the light environment contained no appreciable flicker (e.g., no nearby fluorescent light source).

The above example is but one possibility for the comparison performed at block 450. Each intermediate sum can be compared to a pre-determined threshold, to a relative threshold, or to other values. As indicated above, thresholds or other triggering values may be derived through experimentation. Theoretical methods may also be employed.

A relative threshold may improve detection accuracy in certain lighting conditions. In certain settings, for example, the inventors have observed that large discrepancies between the intermediate sums correlate strongly with the presence of flicker at a particular intensity. Specifically, when a recording device is exposed to an environment with a fluorescent light powered by 60 Hz AC, use of the present methods results in a 120 Hz intermediate sum that is significantly larger than the 100 Hz intermediate sum. As briefly mentioned above, a factor of four has been employed in one embodiment to establish relative thresholds as follows: (1) when the 100 Hz intermediate sum is at least four times larger than the 120 Hz intermediate sum, the ambient environment is deemed to include 100 Hz flicker (e.g., 50 Hz AC power); and (2) when the 120 Hz intermediate sum is at least four times larger than the 100 Hz intermediate sum, the ambient environment is deemed to include 120 Hz flicker (e.g., 60 Hz AC power).

As will be appreciated from the above example, in some cases the comparison at block 450 will not be conclusive. One intermediate sum may not be significantly larger than the other. In particular, the video recording device may be used outdoors, or in a room where natural light is much more intense than that produced by fluorescent lighting or another flickering source. In such a case, the comparison at 450 may conclude with a determination that no appreciable flicker is present.

Regardless of the particular way in which determinations are reached, the comparison at 450 may be followed by an appropriate setting of the exposure timings. For example, upon determining at block 450 that the light source was flickering at 100 Hz, the exposure time would be adjusted accordingly at block 460, e.g., by adjusting the integration time of the image sensor. As previously discussed, adjusting the exposure timings to account for known flicker can substantially reduce visual artifacts in recorded images.

Though the above examples are discussed primarily in the context of 100 Hz and 120 Hz flicker, many other possibilities exist. Instead of searching for intensity variations at one of two pre-selected frequencies, variations may be searched for at only a single pre-selected frequency, or at three or more frequencies. Still further, the methods herein may be employed to search for flicker in an entire range of frequencies, for example by stepping through a range at regular frequency increments. An example of searching at a single frequency would be to search for the frequency of the refresh rate of a computer monitor, in order to compensate for light intensity variations contributed by the computer monitor. Also, searching for flicker at multiple different frequencies may be achieved by performing multiple iterations of a single-frequency search, but successively at different frequencies. Indeed, the above examples could alternately be performed by first running a single-frequency search for 100 Hz flicker, and then successively running a search for 120 Hz flicker.

When searching for flicker occurring at a particular frequency, it may also be desirable to search in a range surrounding the specific frequency of interest. For example, if the main frequency of interest is 100 Hz, the method might be implemented to yield a positive determination in the event of flicker anywhere in the range from 97-103 Hz. Such tolerances may be achieved by looking specifically for the neighboring frequencies (e.g., by employing square waves and scalar products for those frequencies), and/or through empirically-determined thresholds for the scalar product values of the center frequency.

Still further, the methods described herein may also be used in situations involving flicker at multiple different frequencies. In such a setting, square waves and scalar products may be generated for each frequency or range of interest. Thresholds could then be consulted to determine whether or not flicker was present at a particular frequency. As in the other examples, the thresholds could be arrived at through theoretical methods or empirical testing and observation.

The methods described in FIGS. 3 and 4 may be implemented on a digital signal processor (DSP) or other suitable device. DSPs typically employ special purpose hardware and instructions to efficiently process signals of this nature. However, the special purpose hardware and instructions may come at increased cost and/or higher power than other processors, such as the PIC18F2550, for example. The methods described in FIGS. 3 and 4 are concerned with detecting one or more specific pre-selected discrete frequencies. This task typically is less computationally expensive than obtaining samples of a waveform and reconstructing the waveform from the set of samples. Complexity may also be reduced as a result of searching for a limited number of frequencies, as opposed to employing a method geared to comprehensive, multi-frequency detection and analysis. Therefore, the methods described in FIGS. 3 and 4 may have an added advantage that they may be implemented on an inexpensive and/or relatively simple processor.

Use of square waves can also yield various efficiency-related benefits. Square waves can simplify calculations, relative to other waveforms, which can enable software/firmware implementations to carry out tasks using reduced code space and execution time. Square waves may also be simpler to synthesize in some cases, for example, compared to sine or cosine waves.

The particulars of the sampling operation may affect the ability to detect flicker in the ambient light. Typically, the sampling rate will be selected to satisfy the Nyquist-Shannon sampling theorem, which requires sampling to occur at a rate greater than twice the highest frequency to be detected. Accordingly, the components of light detector circuit 40 (FIG. 1) and the associated processing should be configured to sample at a rate of at least 240 Hz in order to identify 120 Hz intensity variations. In addition, the performance of the scalar product technique described above may be affected by the number of samples that are collected via the method of FIG. 3 and employed at 410 (FIG. 4). Generally, it will be desirable to use fewer samples, in order to conserve computing resources and reduce processing time. On the other hand, the sample should be large enough to generate meaningful and reliable results.

In the context of the scalar product method described above, it has been determined that a desirable number of samples may be calculated based on divisors/factors of the pre-selected frequencies of interest. Specifically, in the case of two frequencies, a greatest common factor is identified. Then, the remaining factors of the two frequencies are multiplied together, and that result is multiplied by four. This example method yields a whole number of periods for both frequencies of interest, which can potentially avoid spectrum leakage and the appearance of spurious frequencies. The resulting figure, denoted below as N, forms one basis for a beneficial number of samples. Specifically, if roughly N samples are employed (or a multiple therof), it has been found that the scalar product calculations may be performed efficiently and rapidly, and that the results strongly and accurately identify when flicker is present at one of the two frequencies. In addition, doubling the base sample number of samples in some cases can provide an improved signal to noise ratio.

Referring again to the specific context of an ambient light environment that might include fluorescent light sources powered by 50 Hz or 60 Hz AC, the potential intensity variations would occur at either 100 Hz or 120 Hz. Thus the method would entail processing the samples to determine whether the incident light was varying in intensity at either 100 Hz or 120 Hz. Using the above methodology, the greatest common factor is 20. The remainder factor for 100 Hz is 5 (i.e., 100/20) and the remainder factor for 120 Hz is 6 (i.e., 120/20). The remainder factors are then multiplied together, and further multiplied by a factor of 4, thereby yielding 120. Thus, the desirable base number of samples N is 120.

More generally, when attempting to identify intensity variations occurring at either a first frequency, f1, or a second frequency, f2, the base number of samples N may be calculated as follows: For integer frequencies, each frequency may be factored into a greatest common factor c (i.e., common to each frequency f1 and f2), and a remainder factor. In particular, f1=c*a, and f2=c*b, where a and b are remainder factors. The number of samples may be calculated as the remainder factors multiplied by four: Number of samples=a*b*4. In some settings, it may be sufficient to use an approximate multiple of N samples (e.g., within 10% or 15% of a multiple of N samples) to obtain suitable results.

The multiplier of four is employed in certain examples because 360 degrees divided by 90 degrees is four, which may simplify the calculation of a square wave that is 90 degrees out of phase.

As described above in FIG. 1, camera 100 may include computing system type components that may perform one or more of the above described methods and processes. For example, the camera may include a logic subsystem and a data-holding subsystem.

When included, a logic subsystem may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may include general purpose input and output logic to communicate with circuitry of camera 100.

When included, a data-holding subsystem may include one or more physical devices configured to hold data and/or instructions executable by the logic subsystem to implement the herein described methods and processes. When such methods and processes are implemented, the state of the data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and the data-holding subsystem may be integrated into one or more common devices, such as an application specific integrated circuit (ASIC) or a system on a chip (SOC).

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for detecting flicker in photographic settings, comprising:
   obtaining approximately an integer multiple of N rise time samples from a light detector circuit of a camera, N being derived using a greatest common factor of a first frequency and a second frequency, a value of each of the rise time samples being dependent upon light that is incident upon the camera; and
   processing the rise time samples to determine whether the light that is incident upon the camera is varying in intensity at one of a plurality of frequencies including the first frequency and the second frequency.

2. The method of claim 1, wherein each of the rise time samples is generated by charging the light detector circuit and measuring a rise time of the light detector circuit.

3. The method of claim 1, wherein the first frequency is 100 Hz and the second frequency is 120 Hz.

4. The method of claim 1, wherein N is equal to a product of four, a first remainder factor and a second remainder factor, wherein the first remainder factor is the first frequency divided by the greatest common factor and wherein the second remainder factor is the second frequency divided by the greatest common factor.

5. The method of claim 1, wherein processing the rise time samples includes generating a first scalar product output by multiplying the rise time samples by a periodic signal having a frequency equal to the first frequency, and generating a second scalar product output by multiplying the rise time samples by a periodic signal having a frequency equal to the second frequency.

6. The method of claim 5, wherein the periodic signal having a frequency equal to the first frequency is a square wave, and wherein the periodic signal having a frequency equal to the second frequency is a square wave.

7. The method of claim 5, wherein processing the rise time samples further includes comparing the first scalar product output to the second scalar product output to determine whether the light that is incident upon the camera is varying in intensity at either the first frequency or the second frequency.

8. The method of claim 1, further comprising setting an exposure timing of the camera in response to determining whether the light that is incident upon the camera is varying in intensity at one of the plurality of pre-selected frequencies.

9. A method for detecting for detecting flicker in photographic settings, comprising:
    obtaining a plurality of samples from a light detector circuit of a camera, where a value of each of said plurality of samples is dependent upon intensity of light to which the camera is exposed;
    generating a first scalar product output by multiplying the plurality of samples with a square wave having a first frequency;
    generating a second scalar product output by multiplying the plurality of samples with a square wave having a second frequency;
    comparing the first scalar product output and the second scalar product output to determine whether the light incident upon the camera is varying in intensity at either the first frequency or the second frequency; and
    setting an exposure timing of the camera in response to determining whether the light incident upon the camera is varying in intensity at either the first frequency or the second frequency.

10. The method of claim 9, wherein each of the plurality of samples is a measured rise time associated with a capacitance charging of the light detector circuit.

11. The method of claim 9, wherein generating the first scalar product output includes multiplying the plurality of samples with a 100 Hz square wave, and generating the second scalar product output includes multiplying the plurality of samples with a 120 Hz square wave.

12. The method of claim 11, wherein generating the first scalar product output further includes multiplying the plurality of samples with an additional 100 Hz square wave that is phase-shifted by 90 degrees, and generating the second scalar product output further includes multiplying the plurality of samples with an additional 120 Hz square wave that is phase-shifted by 90 degrees.

13. The method of claim 9, where the light detector circuit includes a phototransistor from which the plurality of samples is obtained.

14. A camera configured to automatically compensate for periodic variations in light intensity, comprising:
    a light detector circuit;
    a logic subsystem operatively coupled with the light detector circuit; and
    a data-holding subsystem including instructions executable by the logic subsystem to:
        obtain a plurality of samples from the light detector circuit, where a value of each of said plurality of samples is dependent upon intensity of light to which the camera is exposed;
        generate a scalar product output by multiplying the plurality of samples with a periodic signal having a pre-selected frequency; and
        process the scalar product output to determine whether light that is incident upon the light detector circuit is varying in intensity at the pre-selected frequency.

15. The camera of claim 14, where the instructions are further configured to generate a plurality of scalar product outputs by multiplying the plurality of samples with each of a plurality of periodic signals having frequencies selected from a group of pre-selected frequencies.

16. The camera of claim 15, where each of the plurality of periodic signals is a square wave.

17. The camera of claim 15, where the instructions are configured to process the plurality of scalar product outputs to determine whether light that is incident upon the light detector circuit is varying in intensity at any of the pre-selected frequencies.

18. The camera of claim 14, wherein the instructions are further configured to set an exposure timing of the camera in response to the processing of the scalar product output.

* * * * *

UNITED STATES PATENT AND TRADEMARK OFFICE
CERTIFICATE OF CORRECTION

| | | |
|---|---|---|
| PATENT NO. | : 8,330,829 B2 | Page 1 of 1 |
| APPLICATION NO. | : 12/755952 | |
| DATED | : December 11, 2012 | |
| INVENTOR(S) | : Goh et al. | |

It is certified that error appears in the above-identified patent and that said Letters Patent is hereby corrected as shown below:

In the Specification

In column 11, line 9, delete "therof" and insert -- thereof --, therefor.

In the Claims

In column 13, line 8, In Claim 9, after "detecting" delete "for detecting".

Signed and Sealed this
Seventeenth Day of February, 2015

Michelle K. Lee
*Deputy Director of the United States Patent and Trademark Office*